(12) United States Patent
Wang et al.

(10) Patent No.: US 6,680,016 B2
(45) Date of Patent: Jan. 20, 2004

(54) METHOD OF FORMING CONDUCTIVE POLYMERIC NANOCOMPOSITE MATERIALS

(75) Inventors: Chyi-Shan Wang, Beavercreek, OH (US); Max D. Alexander, Centerville, OH (US)

(73) Assignee: University of Dayton, Dayton, OH (US)

( * ) Notice: Subject to any disclaimer, the term of this patent is extended or adjusted under 35 U.S.C. 154(b) by 2 days.

(21) Appl. No.: 09/932,169

(22) Filed: Aug. 17, 2001

(65) Prior Publication Data

US 2003/0039816 A1 Feb. 27, 2003

(51) Int. Cl.$^7$ .......................... B29C 70/58; B29C 70/88
(52) U.S. Cl. ........................... 264/105; 264/128
(58) Field of Search ................. 264/104, 105, 264/119, 128, 115; 423/447.3, 447.4, 447.6, 447.7, 448

(56) References Cited

U.S. PATENT DOCUMENTS

| | | | | |
|---|---|---|---|---|
| 4,578,411 A | * | 3/1986 | Budd et al. ................. | 524/156 |
| 5,028,482 A | * | 7/1991 | Jeffs ........................... | 428/323 |
| 5,171,489 A | * | 12/1992 | Hirao et al. ................... | 264/8 |
| 5,213,736 A | * | 5/1993 | Sumita et al. .............. | 264/104 |
| 5,374,415 A | * | 12/1994 | Alig et al. ................ | 423/447.3 |
| 5,424,054 A | * | 6/1995 | Bethune et al. ........... | 423/447.2 |
| 5,433,906 A | * | 7/1995 | Dasch et al. ................ | 264/117 |
| 5,594,060 A | * | 1/1997 | Alig et al. .................. | 524/496 |
| 5,618,875 A | | 4/1997 | Baker et al. | |
| 5,643,502 A | | 7/1997 | Nahass et al. | |
| 5,965,267 A | | 10/1999 | Nolan et al. | |
| 6,156,256 A | * | 12/2000 | Kennel ........................ | 264/461 |
| 6,194,099 B1 | | 2/2001 | Gernov et al. | |
| 6,322,713 B1 | * | 11/2001 | Choi et al. ..................... | 216/38 |
| 6,422,450 B1 | | 7/2002 | Zhou et al. | |

\* cited by examiner

Primary Examiner—Angela Ortiz
(74) Attorney, Agent, or Firm—Dinsmore & Shohl LLP

(57) ABSTRACT

A method of reinforcing a polymeric material with carbon nanofibers is provided in which carbon nanofibers are combined with a polymer and a solvent for the polymer to form a substantially homogeneous mixture, followed by removal of the solvent by evaporation or coagulation. The resulting conductive polymeric nanocomposite material exhibits high electrical and thermal conductivity, enhanced mechanical strength, abrasion resistance, and dimensional stability.

12 Claims, No Drawings

METHOD OF FORMING CONDUCTIVE POLYMERIC NANOCOMPOSITE MATERIALS

BACKGROUND OF THE INVENTION

The present invention is directed to a conductive polymeric nanocomposite material incorporating uniformly dispersed vapor-grown carbon nanofibers, and to a method of forming such a nanocomposite material.

Vapor-grown carbon nanofibers are a unique form of carbon produced by a variation of a vapor-phase catalytic method in which a carbon-containing feedstock is pyrolyzed in the presence of small metal catalyst particles. The resulting nanofibers typically have an outer diameter of 60 to 200 nm, a hollow core of 30–90 nm, and a length on the order of 50 to 100 microns.

The use of vapor-grown carbon nanofibers has been proposed for providing improved mechanical, electronic and thermal transport properties to polymers. For example, vapor-grown carbon nanofibers have been dispersed in polymer matrices by a polymer melt blending method in which the dispersants in the polymer matrix are mechanically sheared apart. See, for example, U.S. Pat. No. 5,643,502. However, as most polymers are incompatible with carbon nanofibers, it is difficult to achieve uniform dispersion of the carbon nanofibers in the polymer matrix. In addition, the high shear mechanical blending can result in the breakage of the carbon nanofibers.

Accordingly, there is still a need in the art for an improved method of reinforcing a polymeric material with carbon nanofibers to produce a composite which has maximum attainable improvement in various mechanical, electrical, and thermal properties.

SUMMARY OF THE INVENTION

The present invention meets that need by providing a method for uniformly dispersing vapor-grown carbon nanofibers into polymer matrices which enhances their mechanical strength, dimensional stability, abrasion resistance, and electrical and thermal conductivity. The uniform dispersion of carbon nanofibers in a polymer matrix is achieved by dissolving the polymer in a solvent with the nanofibers, followed by evaporation or coagulation of the solvent.

According to one aspect of the present invention, a method of forming a conductive polymeric nanocomposite material incorporating carbon nanofibers is provided comprising providing vapor grown nanofibers, combining the nanofibers with a solvent to form a solution mixture, and adding a polymer to the solution mixture to form a substantially homogeneous mixture. The solvent is then removed from the mixture, preferably by evaporation or coagulation.

In an alternative embodiment of the invention, the method may comprise combining the carbon nanofibers, polymer, and solvent to form a substantially homogeneous mixture, followed by removal of the solvent.

The polymer used in the present invention is preferably selected from the group consisting of polyurethanes, polyimides, epoxy resins, silicone polymers, and aromatic-heterocylic rigid-rod and ladder polymers. The solvent is preferably selected from the group consisting of dimethyl sulfoxide, tetrahydrofuran, acetone, methanesulfonic acid, polyphosphoric acid and N,N-dimethyl acetamide. Preferably, both the polymer and the solvent for the polymer are polar.

The carbon nanofibers used in the present invention may comprise as-grown fibers, pyrolytically stripped fibers, or heat treated fibers.

The method of the present invention results in a conductive polymeric nanocomposite material having a conductivity which may be tailored, depending on the desired application, from less than 0.001 S/cm to greater than 20 S/cm. Where the conductive polymeric nanocomposite material is incorporated with heat-treated carbon nanofibers, the nanocomposite material may have an electrical conductivity greater than 20 S/cm, while materials incorporated with low concentrations of as-grown or pyrolytically stripped carbon nanofibers may be tailored to have an electrical conductivity smaller than about $10^{-6}$ S/cm.

The conductive polymeric nanocomposite material formed by the present invention preferably has an electronic conducting percolation threshold of less than 1% by volume of the carbon nanofibers.

The polymeric nanocomposite materials formed by the method of the present invention may be used to form conductive paints, coatings, caulks, sealants, adhesives, fibers, thin films, thick sheets, tubes, and large structural components. The carbon nanofibers in the resulting nanocomposite materials may be used to confer the desired mechanical strength, stiffness, dimensional stability, thermal conductivity, and tribological properties (i.e., reduced surface friction) in such products.

The nanocomposite materials may be used in a wide variety of commercial applications including space, aerospace, electronic, automotive, and chemical industries. The nanocomposite materials may also be used in electromagnetic interference shielding, electromagnetic pulse applications, electrical signal transfer, electrostatic painting of panels, electrostatic discharge and electro-optical devices such as photovoltaic cells.

Accordingly, it is a feature of the present invention to provide a method of forming a conductive polymeric nanocomposite material which results in uniform dispersion of carbon nanofibers in a polymeric matrix. Other features and advantages of the invention will be apparent from the following description and the appended claims.

DETAILED DESCRIPTION OF THE PREFERRED EMBODIMENTS

We have found that the polymer nanocomposite material produced by the method of the present invention is two to three orders of magnitude more conductive than that produced by a polymer melt blending method when the same amount of carbon nanofibers is used. We have also found that the resulting polymer nanocomposite material has a very low electronic conducting percolation threshold of less than 1% by volume of the carbon nanofibers, which is indicative of an extremely large aspect ratio of the carbon nanofibers. This also indicates that the method of the present invention is more effective in uniformly dispersing the carbon nanofibers in the polymer matrices and preserving a large aspect ratio of length to diameter of the nanofibers than prior polymer melt blending methods. It is important to maintain the large aspect ratio of the carbon nanofibers to confer maximum attainable reinforcement, especially for applications such as the use of elastomeric polymers for forming gaskets or seal structures.

The method of the present invention achieves uniform dispersion of vapor-grown carbon nanofibers in polymer matrices by dissolving the polymer in a solvent with the carbon nanofibers. While carbon nanofibers alone do not disperse well in organic solvents, we have found that they disperse very well in the presence of a polymer. Accordingly, the carbon nanofibers are combined with the polymer and solvent, followed by evaporation or coagulation of the solvent to form the conductive polymeric nanocomposite material. After the solvent is removed, the polymer nanocomposite material can be further processed into various shapes by conventional extrusion and molding techniques without losing its conductivity.

The method of the present invention provides an advantage over prior melt-blending processes in that a low-temperature solution process is used to disperse the carbon nanofibers. The method does not require high shear mixing of the polymer melt at elevated temperatures, which typically degrades the aspect ratio of the carbon nanofibers and leads to inferior reinforcement.

In addition, the mechanical and thermal transport properties of the resulting polymer nanocomposite material may be tailored by using different types and amounts of the carbon nanofibers. For example, in EMI shielding applications, the resulting conductivity should be greater than 1 S/cm. For electrostatic painting of panels, the desired conductivity is about $10^{-4}$ to $10^{-6}$ S/cm, and for electrostatic discharge applications, about $10^{-8}$ to $10^{-10}$ S/cm.

Preferred polymers for use in the present invention include polar polymers; however, it should be appreciated that any polymer may be used in the present invention as long as it is soluble in a solvent. Preferred polymers include polyurethanes, polyimides, epoxy resins, silicone polymers, and aromatic-heterocyclic rigid-rod and ladder polymers. Preferred polyurethanes include thermoplastic polyurethanes. A preferred ladder polymer for use in the present invention is poly(benzimidazobenzophenanthroline) (BBL). The polymer is preferably present in a concentration of at least 10 wt %; however, it should be appreciated that the concentration of the polymer may vary depending on the desired properties and applications, such as coatings, of the resulting composite material.

Preferred solvents for use in the present invention are polar solvents and include dimethyl sulfoxide, acetone, tetrahydrofuran, N,N-dimethyl acetamide, methanesulfonic acid, and polyphosphoric acid.

The carbon nanofibers used in the present invention are preferably prepared in accordance with U.S. Pat. No. 6,156,256, incorporated herein by reference. Several types of carbon nanofibers may be used in the present invention including as-grown fibers, pyrolytically stripped fibers, and heat treated fibers. By heat treated fibers, it is meant that the nanofibers are fully graphitized by slowly heating the fibers to 3,000° C. and then slowly cooling the fibers. It has been found that when carbon nanofibers are heat treated, the order of the surface chemical-vapor-deposited carbon is highly increased, resulting in substantially improved mechanical, electronic, and thermal transport properties. Heat-treated carbon nanofibers have an electrical conductivity close to that of highly ordered pyrolytic graphite and a thermal conductivity which is five times as high as that of copper. Heat treated fibers are preferred in applications where high conductivity and low carbon nanofiber loading are desired.

The method of the present invention is preferably carried out by mixing the carbon nanofibers and the desired polymer in a solvent, preferably in a closed container. While the carbon nanofibers are preferably dispersed in the solvent prior to addition of the polymer, the nanofibers, polymer and solvent may also be combined at the same time. The resulting nanocomposite material may be further processed according to the desired application. For example, the material may be formed into a thin film which is cast from the solution mixture by evaporating the solvent at a temperature which is below the boiling point of the solvent. Alternatively, the solvent may be removed by coagulation in which the solution mixture is formed into a film or fiber and then immersed in a nonsolvent, such as water, to coagulate the film. The solution mixture may also be formed into thin films by spin coating and dip coating methods. The solution mixture may also be formed into large components such as thick sheets or panels by spraying or deposition, or by extruding or molding the dried composite material.

In order that the invention may be more readily understood, reference is made to the following examples which are intended to illustrate the invention, but not limit the scope thereof.

EXAMPLE 1

A solution mixture was prepared by mixing 0.2 grams of an as-grown carbon nanofiber and 1 gram of a thermoplastic polyurethane in 10 grams of dimethyl sulfoxide in a closed glass container. The mixture was agitated with a magnetic stir bar. A thin film was cast from the solution mixture by evaporating the solvent at a temperature of about 80° C. on a hot plate. The resulting polymer nanocomposite film was further dried in a vacuum oven at 80° C. under reduced pressure. The film had a concentration of 16.7% by weight and 11.7% by volume of the carbon nanofibers and exhibited an electrical conductivity of 0.25 S/cm.

EXAMPLE 2

A solution mixture was prepared by mixing 0.2 grams of a heat-treated carbon nanofiber and 1 gram of a thermoplastic polyurethane in 10 grams of dimethyl sulfoxide in a closed glass container. The mixture was then agitated with a magnetic stir bar. A thin film was cast from the solution mixture by evaporating the solvent at a temperature of about 80° C. on a hot plate. The polymer nanocomposite film was further dried in a vacuum oven at 80° C. under reduced pressure. The film had a concentration of 16.7% by weight and 10.2% by volume of the carbon nanofibers and exhibited an electrical conductivity of 5.5 S/cm. The film retained a conductivity of 1.3 S/cm at 100% elongation (stretched to twice its original length).

EXAMPLE 3

A series of solution mixtures of a thermoplastic polyurethane and a heat-treated carbon nanofiber were prepared in tetrahydrofuran (THF) using the method described in Examples 1 and 2. Thin films were cast from the solution mixtures by evaporating the solvent at room temperature. The conductivity values of the resulting films are shown in Table 1 below.

TABLE 1

Conductivity of polyurethane nanocomposite films in relation to the concentration of heat-treated carbon nanofibers.

| Nanofiber (g) | Polyurethane (g) | THF (g) | Wt % | Vol. % | Conductivity (S/cm) |
|---|---|---|---|---|---|
| 0.020 | 1.00 | 10.0 | 1.96% | 1.12% | 0.0038 |
| 0.040 | 1.00 | 10.0 | 3.85% | 2.22% | 0.10 |
| 0.080 | 1.00 | 10.0 | 7.41% | 4.34% | 0.54 |
| 0.120 | 1.00 | 10.0 | 10.7% | 6.37% | 1.14 |

TABLE 1-continued

Conductivity of polyurethane nanocomposite films in relation to the concentration of heat-treated carbon nanofibers.

| Nanofiber (g) | Polyurethane (g) | THF (g) | Wt % | Vol. % | Conductivity (S/cm) |
|---|---|---|---|---|---|
| 0.160 | 1.00 | 10.0 | 13.8% | 8.31% | 3.93 |
| 0.200 | 1.00 | 10.0 | 16.7% | 10.2% | 4.69 |
| 0.240 | 1.00 | 10.0 | 19.4% | 12.0% | 8.70 |
| 0.280 | 1.00 | 10.0 | 21.9% | 13.7% | 16.6 |
| 0.320 | 1.00 | 10.0 | 24.2% | 15.4% | 20.8 |

COMPARATIVE EXAMPLE 4

A nanocomposite material was prepared by a melt blending method in which 20 grams of heat-treated carbon nanofibers and 100 grams of a thermoplastic polyurethane were mixed in a Haake Rheomixer at 150° C. for 2 hours. The resulting composite material was pressed into a thin film with heat. The film had a concentration of 16.7% by weight and 10.2% by volume of the carbon nanofibers and exhibited an electrical conductivity from 0.0052 to 0.0098 S/cm. As can be seen, these conductivity values are two to three orders of magnitude lower than that of the nanocomposite film containing the same concentration of the carbon nanofibers prepared by Examples 1–3.

EXAMPLE 5

A nanocomposite material of polyimide/amic acid and heat-treated carbon nanofibers was prepared from a solution mixture in N,N-dimethyl acetamide (DMAC). The solution mixture was prepared by mixing 0.202 g of heat-treated carbon nanofibers and 1 g of polyimide/amic acid in 10.0 g of DMAC in a closed glass container. The mixture was then agitated with a magnetic stir bar. A thin film was prepared from the solution mixture by evaporating the solvent at 60° C. The film was further dried in a vacuum oven at 200° C. for 2 hours. The film had a concentration of 16.8% by weight of the carbon nanofibers and exhibited an electrical conductivity from 1.7 to 2.8 S/cm.

EXAMPLE 6

A solution mixture of 0.302 g of heat-treated carbon nanofibers and 1.0 g of polyimide/amic acid was prepared in 10 g of DMAC using the method described in Example 5. The solution mixture was cast into a film by evaporating the solvent at 60° C. The film was further dried in a vacuum oven at 200° C. for 2 hours. The film had a concentration of 23.2% by weight of the carbon nanofibers and exhibited an electrical conductivity from 5.1 to 7.7 S/cm.

EXAMPLE 7

A solution mixture was prepared by mixing 0.02 g of heat-treated carbon nanofibers and 0.1 g poly(benzimidazobenzophenanthroline) (BBL) in 20 g of methanesulfonic acid in a closed glass container. The solution mixture was agitated with a magnetic stir bar and then doctor-bladed into a film on a glass slide and immersed in water to coagulate the nanocomposite film. The film was then air-dried at room temperature. The film had a concentration of 16.7% by weight of the carbon nanofiber and an electrical conductivity of 1.0 S/cm.

EXAMPLE 8

11 g of an epoxy resin was mixed with 1 g of heat-treated carbon nanofibers which had been presoaked in 46 g of tetrahydrofuran (THF) to form a uniform mixture by mechanical agitation. 2.86 g of a curing agent was then added to the mixture. The THF was removed by evaporation and the composite material was cured at 150° F. for one hour and at 250° F. for another hour. The resulting thermosetting composite material contained 6.77% by weight of the carbon nanofibers and exhibited an electrical conductivity of 0.5 S/cm.

It will be obvious to those skilled in the art that various changes may be made without departing from the scope of the invention which is not to be considered limited to what is described in the specification.

What is claimed is:

1. A method of forming a conductive polymeric nanocomposite material incorporating carbon nanofibers comprising:

providing vapor grown carbon nanofibers having a high aspect ratio;

combining said nanofibers with a solvent to form a solution mixture having a low viscosity;

adding a polymer to said solution mixture and mixing to form a substantially homogeneous solution mixture so that the nanofibers are highly dispersed therein, wherein said homogeneous solution mixture is obtained without requiring high shear mixing at elevated temperatures; and removing said solvent from said substantially homogeneous solution mixture.

2. The method of claim 1 in which said solvent is removed by evaporation.

3. The method of claim 1 in which said solvent is removed by coagulation.

4. The method of claim 1 in which said polymer is selected from the group consisting of polyurethanes, polyimides, epoxy resins, silicone polymers, and aromatic-heterocyclic rigid-rod and ladder polymers.

5. The method of claim 1 in which said polymer is polar.

6. The method of claim 1 in which said solvent is selected from the group consisting of dimethyl sulfoxide, tetrahydrofuran, acetone, methanesulfonic acid, polyphosphoric acid, and N,N-dimethyl acetamide.

7. The method of claim 1 in which said solvent is polar.

8. The method of claim 1 in which said carbon nanofibers are selected from the group consisting of as-grown fibers, pyrolytically stripped fibers, and heat treated fibers.

9. The method of claim 1 including casting said mixture into a film.

10. A method of forming a conductive polymeric nanocomposite material incorporating carbon nanofibers comprising:

providing vapor grown carbon nanofibers to form a low carbon loading;

providing a polymer;

combining said nanofibers and said polymer with a solvent to form a substantially low viscosity homogeneous solution mixture so that the nanofibers are highly dispersed therein, wherein said homogeneous solution mixture is obtained without reguiring high shear mixing at elevated temperatures;

removing said solvent from said mixture; and forming a polymeric nanocomposite material having a high elevated conductivity.

11. A method of forming a conductive polymeric nanocomposite material incorporating carbon nanofibers comprising:

providing vapor grown nanofibers;

combining said nanofibers with a solvent to form a solution mixture;

adding a polymer to said solution mixture to form a substantially homogenous solution mixture; and removing said solvent from said substantially homogeneous solution mixture; wherein said nanocomposite material has an electronic conducting percolation threshold of less than 1% by volume of said carbon nanofibers.

12. A method of forming a conductive polymeric nanocomposite material incorporating carbon nanofibers comprising:

providing vapor grown nanofibers;

combining said nanofibers with a solvent to form a solution mixture;

adding a polymer to said solution mixture to form a substantially homogenous solution mixture; and removing said solvent from said substantially homogeneous solution mixtures; wherein said nanocomposite material has a conductivity of from about 0.0038 S/cm at about 1.96% by weight of the carbon nanofibers to greater than 20 S/cm at about 24.2% by weight of the carbon nanofibers.

* * * * *

UNITED STATES PATENT AND TRADEMARK OFFICE
CERTIFICATE OF CORRECTION

PATENT NO. : 6,680,016 B2  Page 1 of 1
DATED : January 20, 2004
INVENTOR(S) : Wang et al.

It is certified that error appears in the above-identified patent and that said Letters Patent is hereby corrected as shown below:

Column 6,
Line 60, "reguiring" should read -- requiring --
Line 64, "elevated" should be -- electrical --

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,680,016 B2
DATED : January 20, 2004
INVENTOR(S) : Wang et al.

It is certified that error appears in the above-identified patent and that said Letters Patent is hereby corrected as shown below:

<u>Column 1,</u>
Line 4, should read
-- STATEMENT REGARDING FEDERALLY SPONSORED RESEARCH OR DEVELOPMENT
This invention was made with government support under Contract No. F33615-95-D-5044 awarded by the United States Air Force. The government has certain rights in the invention. --.

Signed and Sealed this

Twenty-eighth Day of December, 2004

JON W. DUDAS
*Director of the United States Patent and Trademark Office*